March 10, 1931.  A. T. J. BAHR  1,795,820
STARTING MACHINE
Filed Sept. 13, 1928   4 Sheets-Sheet 2
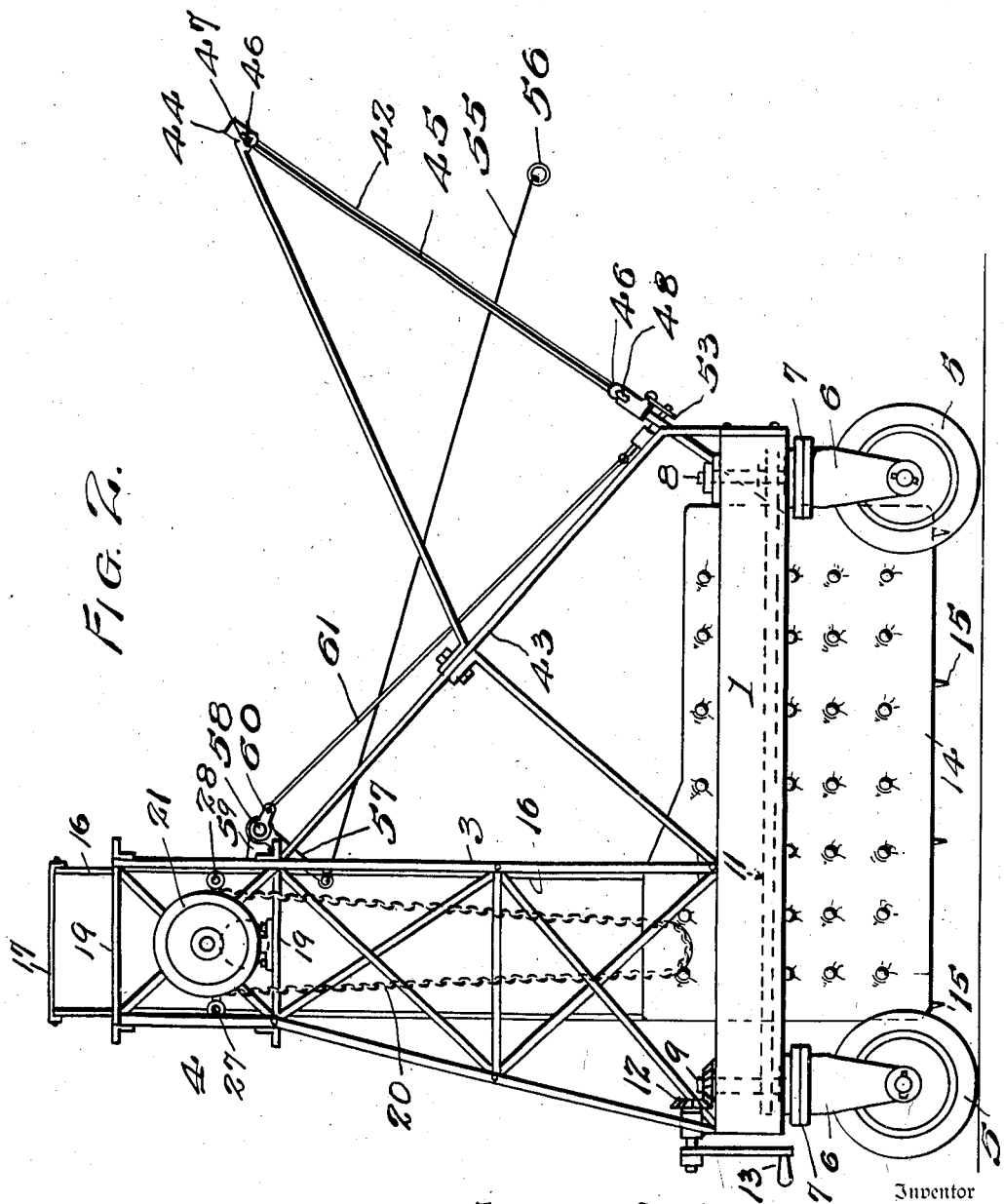

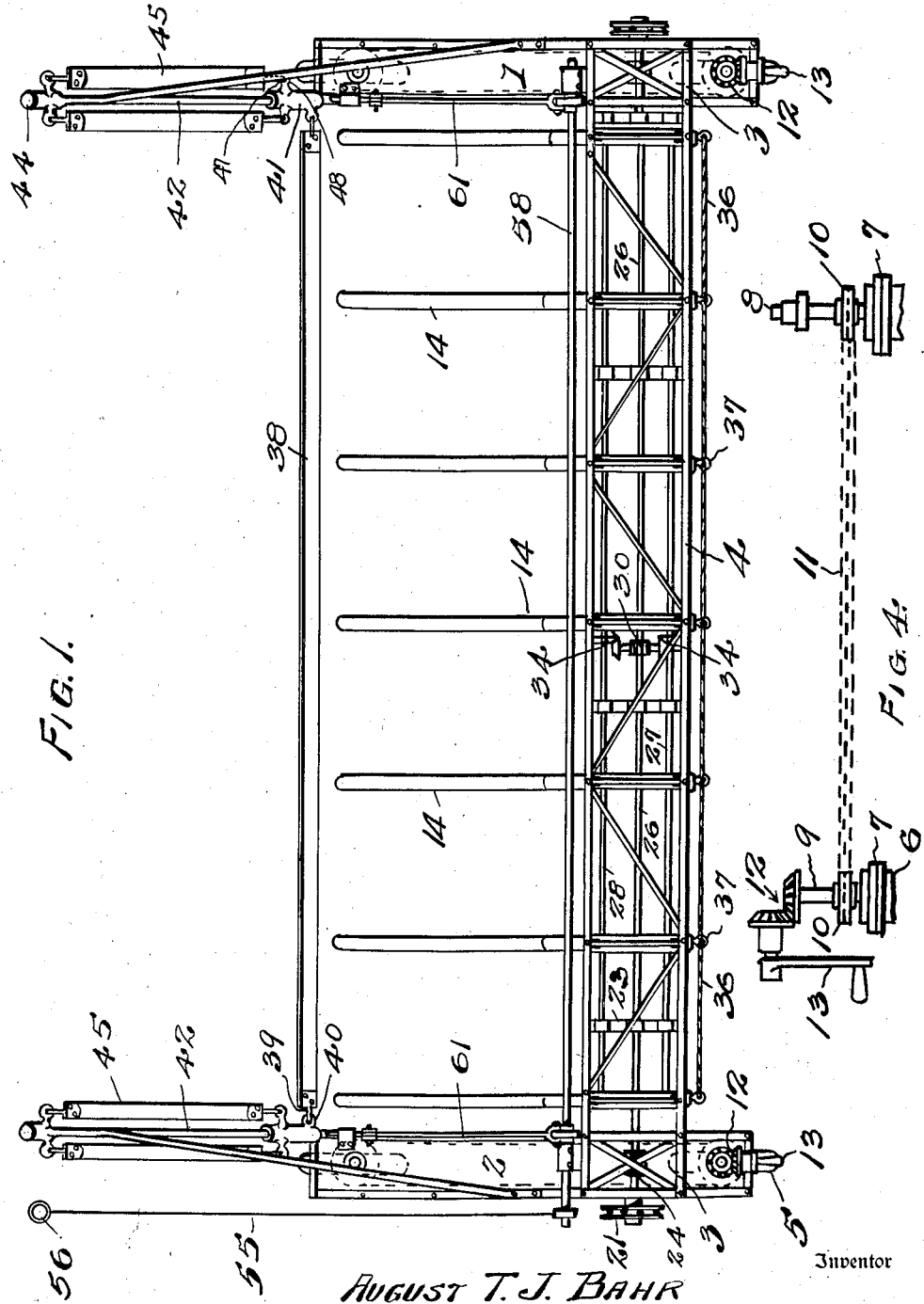

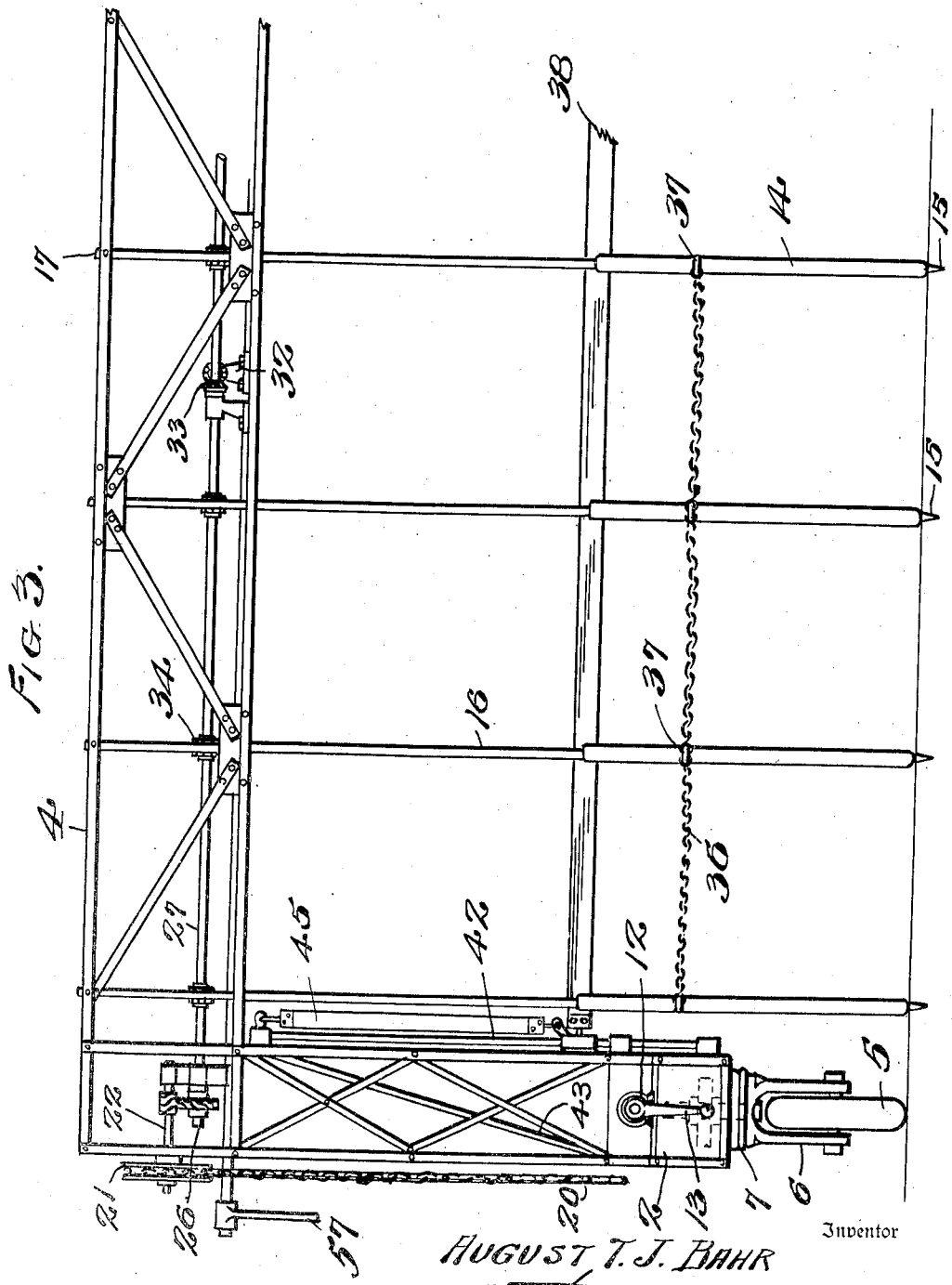

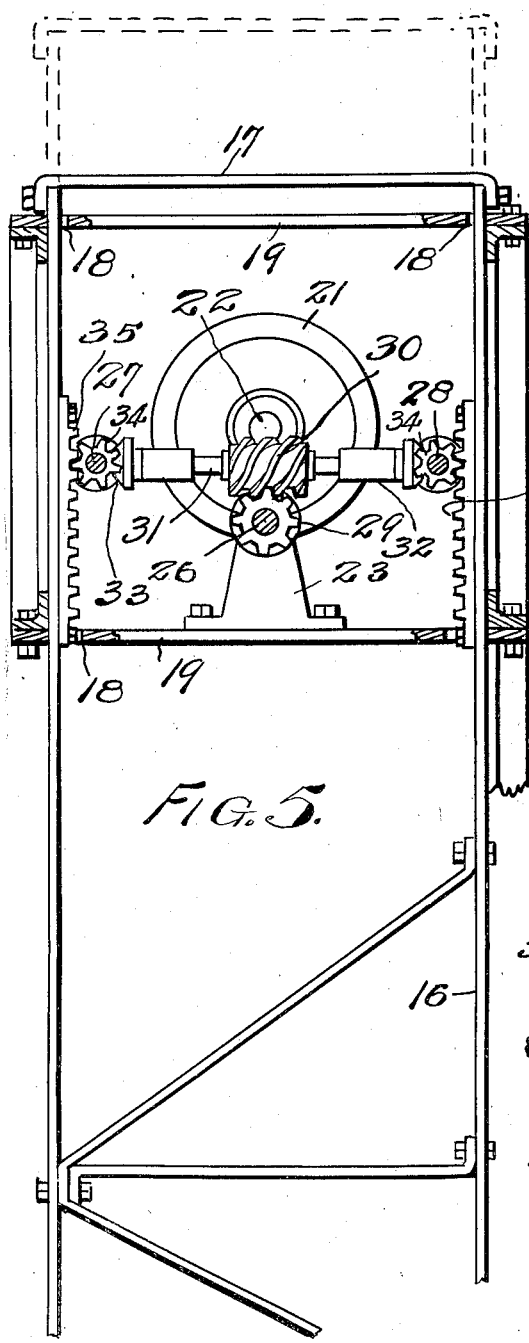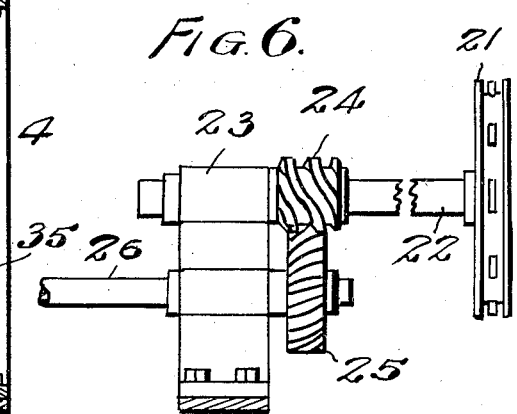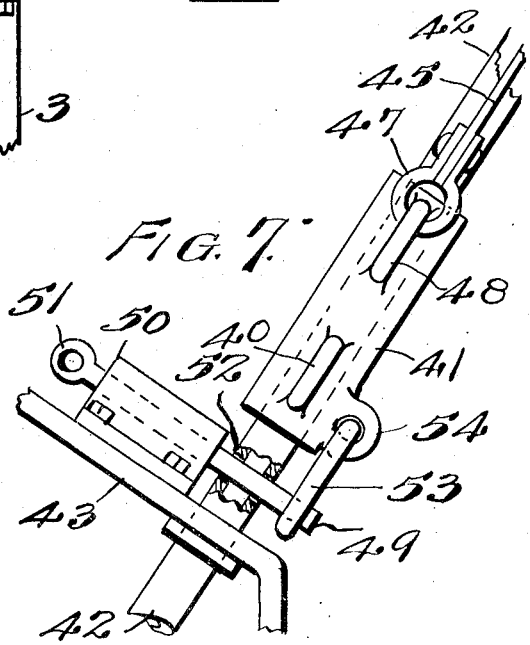

Patented Mar. 10, 1931

1,795,820

UNITED STATES PATENT OFFICE

AUGUST T. J. BAHR, OF KANSAS CITY, MISSOURI, ASSIGNOR, BY MESNE ASSIGNMENTS, TO BAHR STARTING GATE CORPORATION, OF CHICAGO, ILLINOIS, A CORPORATION OF ILLINOIS

STARTING MACHINE

Application filed September 13, 1928. Serial No. 305,705.

My present invention relates to improvements in starting machines for use at race tracks in starting horse races, whippet races, etc. My invention contemplates the employment of a portable wheeled appliance that may be drawn by a tractor, by horse power, or the appliance may manually be trundled or rolled to and from starting position, and the portability of the appliance permits it to be drawn from place to place on the race track in order that short or longer races may be started from the machine. The appliance or machine is capable of being manufactured in various sizes to accommodate different numbers of horses starting in the race, and for this purpose the stalls may be arranged in sections of predetermined numbers and one or more sections of stalls may be employed as required.

The portability of the appliance also adapts it for use by horse breeders or trainers to school the young horses and train the old ones for the race. The machine is provided with means whereby it may be steered and the steering means is manually operated so that the machine may with facility be steered by two attendants. In carrying out my invention, I utilize a plurality of partitions forming stalls and means are provided whereby the partitions may be elevated to inoperative position for transporting the machine, and the partitions may readily be lowered, by manually controlled means, to the surface of the race track, and the partitions are then firmly held in upright position. In starting position, the stalls are of course adapted to accommodate the horses and they are maintained in alinement to insure a fair and even start for all of the horses, and the getaway is quickly arranged and effected. After the getaway, the stalls are with facility elevated from the surface of the track, and the machine may then be quickly rolled from the track out of the way of the racing horses.

The stalls are equipped with movable front and rear barriers, the latter being controlled by track attendants, and the forward or front barrier is under control of the starter. Operating means for the front barrier are provided whereby the starter who stands in a convenient position for observation of the starting horses, may at the proper time raise the barrier for the start of the race. Means are provided under control of the starter whereby the front barrier may be released and removed without possibility of unfair advantage to a jockey or contestant, and the barrier as arranged and operated prevents a jockey from "beating the barrier."

The starting machine may be made in various sizes and is preferably constructed of metal in order that it may be strong and durable and, at the same time, light in weight for convenience in transportation.

The invention consists in certain novel combinations and arrangements of parts as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention.

Figure 1 is a top plan view of a starting machine with stalls to accommodate six contestants, the front and rear barriers being set in position for the start;

Fig. 2 is a view in side elevation of the machine as seen from the right in Fig. 1, but with the stall partitions elevated;

Fig. 3 is a rear view of a portion of the machine showing the stalls in lowered position and with the front and rear barriers in position before the start;

Fig. 4 is a detail view showing the steering mechanism for a pair of wheels at one end of the machine;

Fig. 5 is an enlarged detail sectional view through the truss or bridge portion of the machine frame illustrating the means for raising and lowering the partitions of the stalls;

Fig. 6 is a detail view showing the manually controlled actuating means for operating the stall partitions; and Fig. 7 is an enlarged detail view showing the latch bolt and a part of the front barrier in locked position, In carrying out my invention, I preferably use a pair of side boxes 1 and 2 that are spaced apart and arranged in parallelism, as the supporting means for the frame of the appliance. A pair of uprights 3 rise from these supporting boxes and these uprights are connected by a cross truss 4. The distance between the two side boxes is of course determined by the number of stalls to be used, and the truss 4 is, of course, elevated a sufficient distance to permit the horses to pass thereunder from the rear when they are lining up for the race.

The machine is provided with two pairs of pneumatic wheels 5, one pair for each side box and each of the wheels has a bearing yoke 6 and ball bearings 7 for the spindles 8 and 9. The spindles are provided with bearings in the steel side boxes 1 and 2 and the pairs of wheels are moved in unison to steer the machine as it is being taken to the track or removed therefrom. Each of the spindles has a sprocket wheel 10 disposed in horizontal position and located in a side box, and these sprocket wheels in pairs are connected by a steering chain 11 so that the spindles of a pair of wheels may be turned in unison. At the rear end of each side box, a bevel gear couple 12 is provided and the gear couple is actuated by means of a hand crank or steering handle 13. Thus, two men may be employed at the rear of the machine for manipulating the handles 13 and steering the machine as it is drawn into position or removed therefrom.

In Fig. 1 of the drawings, I have indicated six stalls, but it will be understood that the number may be varied in accordance with the requirements. The stalls are fashioned between a pair of partitions which are arranged in parallelism, and the partitions are spaced equidistant between the two side boxes 1 and 2. Each partition is provided with a main padded portion 14 in which the padding is built up on a frame that may be made of wire mesh, and the lower edge of each partition is provided with a number of spaced spikes 15 in the form of sharpened bolts that are designed to penetrate the surface of the race track and hold the portitions against lateral or longitudinal movement. Each partition has an upright frame portion 16 and a cross top bar 17, and in Fig. 5, it will be seen that the frame 16 passes through guide slots 18 in cross bars 19 of the truss 4. Thus it will be apparent that the partition may be elevated or lowered and in its movement it is guided through the truss, so that the partition is held against displacement. Of course, when the partition is in lowered position, the spikes in the ground surface and the truss at the top of the frame 16 hold the partition against movement and the partition thus forms an immovable side wall for the stall.

All of the partitions are simultaneously lowered or raised by manually controlled means at either end of the machine. For this purpose, I employ a pair of chains 20 which hang from sprocket wheels 21 at each end of the machine. These sprocket wheels are rotatable with stub shafts 22 that are supported in bearings 23 at the top portions of the upright frames 3, and each stub shaft has a spur gear 24 thereon. The gears 24 engage complementary gears 25 on the opposite ends of an operating shaft 26 which extends from end to end of the truss and is located centrally thereof. This operating shaft when turned by the chains and sprocket wheels is designed to rotate a pair of rack shafts 27 and 28 located at the opposite sides of the operating shaft and supported in bearings as 23. As best seen in Fig. 5, the operating shaft 26 is provided with a worm gear 29 which engages threads 30 on a cross shaft 31 which is journaled in suitable bearings as 32. This cross shaft may be located at the approximate center of the truss and is designed to transmit power from the operating shaft to the two rack shafts in order that all of the partitions may be simultaneously lowered or raised through the manipulation of the chains 20 and sprocket wheels 21. Cross shaft 31 has a gear couple 33 at each end for transmitting power from the cross shaft to the rack shafts in order to accomplish the raising and lowering of the partitions. Each of the rack shafts has a pinion 34 for each of the partitions, and each of the partitions or rather the frame 16 of each of the partitions has a pair of rack bars 35 for coaction with the pinions. Thus, in Fig. 5, it will be seen that the pinions 34 are designed to elevate the partition to dotted line position and thus raise the stall partitions from the ground so that the appliance or machine may be transported.

The rear barriers for the stalls are made up of separate short chains as 36 which may of course be properly padded to protect the horses, and each of these chains has at its ends a snap hook or other quick detachable fastening member that engages an eye bolt or eye 37 on the rear end of the padded stall partition 14. Thus, after the horses have entered the stalls, these rear barriers may quickly be swung to position and fastened to the eye bolts 37 for enclosing the rear end of the stalls for the horses.

The front barrier 38 is made up of a flat tape of suitable material and is stretched across in front of the stalls as indicated in Fig. 1. At its ends, this tape is provided with hooks 39 that are adapted to engage in perforated ears 40 fashioned on the complementary slide sleeves 41. These slide sleeves are adapted to slide on the pair of spaced tubular guide posts 42 which, as shown in Fig. 2, incline outwardly and upwardly from the machine and are held rigid therewith by means of barrier frames 43 which are secured to the heads or caps 44 on the ends of these tubular guide posts 42.

The front barrier is designed to move upwardly and in front of the waiting horses when the race is started and the barrier of course is under control of the starter at the race. The barrier is withdrawn and lifted to open position by resilient means or elastic members which connect the caps 44 with the slide sleeves 41. These elastic members may be fashioned of any suitable material, but in the drawings I have shown two pairs of elastic tapes 45, one pair for each of the slide sleeves. These tapes are provided with attaching rings 46 at their ends and the rings are attached to the caps 44 by eyes 47 and to the slide sleeves 41 by eyes 48. In Fig. 2, the slide sleeves are in lowered position and the elastic tapes 45 are stretched as indicated, and when the barrier is released, these elastic tapes 45 immediately pull the barrier upwardly and outwardly away from the stalls to release the horses and start the race.

The barrier is held in lowered position by means of a pair of latch bolts 49, supported in housings 50, one at each end of the machine and at the front of the side boxes 1 and 2. The latch bolt as shown in Fig. 7 is provided with an eye 51 at its rear end and each bolt passes through a guide hole 52 in the tubular post 42. A link 53 which is pivotally carried in the perforated ear 54 of the slide sleeve 41, is slipped over the projecting end of the slide bolt 49. Thus, when the barrier is pulled down and the elastic tapes 45 are stretched, the elasticity of these tapes holds the links 53 in locked relation to the slide bolt 49.

The two slide bolts are simultaneously released or withdrawn by means manually operated by the starter, and this starting means may be a cable or cord 55 with a ring 56 at its end. The cable and ring are located at the left or inside end of the starting machine in convenient position for use by the starter, and a pull on the ring and cable releases the barrier to start the race. The cord or cable 55 is connected to a lever 57 on the rock shaft 58 which is journaled in bearings 59 at the front of the truss. This shaft extends across the machine and the duplicate slide bolts are operated through a pair of rock arms 60 on the rock shaft and links 61 which connect these arms with the bolt head 51. Thus it will be apparent that the barrier may be placed in position by pulling down the two slide sleeves and then with the links 53 and slide bolts 49, the front barrier is locked in position. By pulling on the ring and cord, the barrier is released to insure a fair getaway of the horses.

Various changes and alterations within the scope of my appended claims may be made within the principles of my invention and such changes are contemplated.

Having thus fully described my invention, what I claim as new and desire to secure by Letters Patent is—

1. In a wheeled starting machine, the combination with a pair of side boxes and uprights therefrom, and a truss connecting said uprights, of pairs of steering wheels for the boxes and manually operated means for controlling said steering wheels, a plurality of vertically movable stall partitions supported from the truss, and means for relatively moving the stall partitions.

2. The combination in a portable starting machine with a supporting frame, of a plurality of vertically movable stall partitions, an operating shaft supported in the frame and a pair of pinion shafts adjacent said operating shaft, means for turning the operating shaft, means for transmitting power from the operating shaft to the pinion shafts, and coacting means on the pinion shafts and stall partitions for vertically moving the latter.

3. In a starting machine, the combination with an elevated truss and a plurality of stall partitions, of an operating shaft extending through the truss and manually controlled means for turning said shaft, of a pair of rack shafts, means for transmitting power from the operating shaft to the rack shafts, rack wheels on said shafts, and rack bars on the stall partitions for coaction therewith.

4. The combination with a barrier frame including a pair of guide posts and slide sleeves on said posts, of caps on the posts and pairs of elastic members connecting said caps and sleeves, a locking link on each sleeve, said posts having bolt holes, and a bolt slidable in said holes for co-action with each locking link.

In testimony whereof I have affixed my signature.

AUGUST T. J. BAHR.